(12) United States Patent
Tseng

(10) Patent No.: US 8,767,590 B2
(45) Date of Patent: Jul. 1, 2014

(54) MULTIMEDIA CONFERENCE SYSTEM AND METHOD WHICH ENABLES COMMUNICATION BETWEEN PRIVATE NETWORK AND INTERNET

(75) Inventor: Mu-Chun Tseng, Taipei (TW)

(73) Assignee: Plustek Inc., Nangang District (TW)

( * ) Notice: Subject to any disclaimer, the term of this patent is extended or adjusted under 35 U.S.C. 154(b) by 2391 days.

(21) Appl. No.: 11/190,104

(22) Filed: Jul. 27, 2005

(65) Prior Publication Data

US 2006/0203749 A1  Sep. 14, 2006

(30) Foreign Application Priority Data

Mar. 9, 2005  (TW) ............................... 94107406 A

(51) Int. Cl.
*H04Q 11/00*  (2006.01)
(52) U.S. Cl.
USPC .......................................... 370/260; 370/352
(58) Field of Classification Search
USPC .................... 370/260, 352, 392; 709/227, 229
See application file for complete search history.

(56) References Cited

U.S. PATENT DOCUMENTS

| 6,219,710 | B1 | 4/2001 | Gray et al. | |
| 7,020,130 | B2 * | 3/2006 | Krause et al. | 370/352 |
| 7,233,980 | B1 * | 6/2007 | Holden et al. | 709/219 |
| 7,359,382 | B2 * | 4/2008 | Liu et al. | 370/392 |
| 7,409,465 | B2 * | 8/2008 | Vimpari | 709/250 |
| 7,542,466 | B2 * | 6/2009 | Ikenaga et al. | 370/389 |
| 7,606,192 | B2 * | 10/2009 | Uhlik | 370/329 |
| 7,751,387 | B2 * | 7/2010 | Hwang et al. | 370/352 |
| 2002/0138622 | A1 * | 9/2002 | Dorenbosch et al. | 709/227 |
| 2002/0194347 | A1 * | 12/2002 | Koo et al. | 709/227 |
| 2003/0118002 | A1 * | 6/2003 | Bradd et al. | 370/352 |

(Continued)

FOREIGN PATENT DOCUMENTS

WO   WO 2005/046182   *   5/2005   .............. H04L 29/12

OTHER PUBLICATIONS

Newport Networks Ltd., White Paper: "Solving the Firewall and NAT Traversal Issues for Multimedia Services over IP".

(Continued)

*Primary Examiner* — William Deane, Jr.
(74) *Attorney, Agent, or Firm* — Blue Capital Law Firm, P.C.

(57) ABSTRACT

The present invention discloses a multimedia conference system and method that enables peer-to-peer communication between private network and the Internet. The multimedia conference system and method that enables direct peer-to-peer communication between private network and the Internet includes: a plurality of user agents (to receive call requests) constituting a local network; a calling terminal positioned outside the local network and connected to the local network via Internet; a network address translation (NAT) positioned on the gate of the local network as barrier between the calling terminal and the user agent, and a SIP Proxy Server positioned between the calling terminal and private network and logically installed in parallel with said NAT to receive session initiation protocol messages transmitted from the calling terminal, connect, and transmit IP addresses, so as to send the message to specific User Agent(s).

30 Claims, 5 Drawing Sheets

(56) References Cited

U.S. PATENT DOCUMENTS

| | | | |
|---|---|---|---|
| 2004/0088537 A1* | 5/2004 | Swander et al. | 713/153 |
| 2004/0139230 A1 | 7/2004 | Kim | |
| 2004/0160985 A1 | 8/2004 | Kang | |
| 2004/0264439 A1 | 12/2004 | Doherty et al. | |
| 2004/0264449 A1 | 12/2004 | Klaghofer et al. | |
| 2005/0050211 A1* | 3/2005 | Kaul et al. | 709/229 |
| 2005/0083912 A1* | 4/2005 | Afshar et al. | 370/352 |
| 2005/0105526 A1* | 5/2005 | Stiemerling et al. | 370/389 |
| 2005/0210292 A1* | 9/2005 | Adams et al. | 713/201 |
| 2006/0026288 A1* | 2/2006 | Acharya et al. | 709/227 |
| 2006/0045098 A1* | 3/2006 | Krause | 370/396 |
| 2006/0078096 A1* | 4/2006 | Poyhonen et al. | 379/88.12 |
| 2006/0101098 A1* | 5/2006 | Morgan et al. | 707/204 |
| 2006/0126596 A1* | 6/2006 | Shieh et al. | 370/352 |
| 2006/0209794 A1* | 9/2006 | Bae et al. | 370/352 |
| 2007/0189321 A1* | 8/2007 | Lee et al. | 370/445 |
| 2007/0195807 A1* | 8/2007 | Collins et al. | 370/401 |
| 2007/0291733 A1* | 12/2007 | Doran et al. | 370/352 |

OTHER PUBLICATIONS

Newport Networks, Ltd., White Paper: "Enabling Customers to Connect".

Amir Zmora, Radvision, "B2BUA: Enabling Class 5 Capabilities in SIP Designs".

H. Schulzrinne/S. Casner/R. Frederick/V. Jacobson, RTP: "A Transport Protocol for Real-Time Applications", RFC-3550, Internet Engineering Task Force, Jul. 2003.

J. Rosenberg/H. Schulzrinne/G. Camarillo/A. Johnston/J. Peterson/R. Sparks/M. Handley/E. Schooler, SIP: "Session Initiation Protocol", RFC-3261, Internet Engineering Task Force, Jun. 2002.

M. Handley/V. Jacobson, SDP: "Session Description Protocol", RFC-2327, Internet Engineering Task Force, Apr. 1998.

A. Johnston/S. Donovan/R. Sparks/K. Summers, "Session Initiation Protocol (SIP) Basic Call Flow Examples", RFC-3665, Internet Engineering Task Force, Dec. 2003.

* cited by examiner

MULTIMEDIA CONFERENCE SYSTEM AND METHOD WHICH ENABLES COMMUNICATION BETWEEN PRIVATE NETWORK AND INTERNET

The present application is based on, and claims priority from, Taiwanese Patent Application Number 094107406, filed Mar. 9, 2005, the disclosure of which is incorporated by reference herein in its entirety.

BACKGROUND OF THE INVENTION

1. Field of the Invention

The present invention relates to a multimedia conference system and method utilizing Internet to establish a communication between a originating unit and a receiving unit, and more specifically, a multimedia conference system and method that enables direct communication between user agents in the private network and users from the Internet by connecting public network (Internet) and local area network (private network).

2. The Background of the Invention

Up to now, the Internet has been developing mainly in the field of data traffic such as an e-mail (electronic mail) or web, and with the advent of applications requiring transfer of real-time traffic, such as distant learning and teleconference, the Internet is now progressing on the trend to support real time traffic such as voice and image.

The SIP (Session Initiation Protocol) system operating on the basis of the IP (Internet Protocol) consists of a user agent and a network server. The user agent is a terminal, generally functioning as a UAC (User Agent Client) for requesting a call and a UAS (User Agent Server) for responding to a requested call.

The SIP makes use of the existing Internet servers such as the existing Name Server, Authentication server as they are, referring to overall procedures regarding a call session establishment, maintenance, release, and management for the Internet phone. The SIP is a protocol based on a client-server, and develops in such form that a call trying part calls a counterpart in order to get the counterpart to attend a call session. Therefore, the SIP provides functions such as a user position locating, session establishing, session negotiating, session participant managing, and a Call Feature Invocation, including Hold, Transfer, and Mute. Also, for processing a call, the SIP uses a protocol based on a text having syntax and semantics similar to HTTP (Hyper Text Transfer Protocol).

However, the SIP and the associated media protocol (e.g. RTP), which are the key enabler of new multimedia over IP services, are blocked by Firewalls and network address translation (NAT) devices, which are typically deployed on IP network boundaries to perform security service.

Firewalls deployed on the boundary of the local area networks are generally configured to block all unsolicited inbound traffic, thus preventing the entry of SIP-controlled media traffic.

NATs translate IP address and port numbers in private address ranges into public address when traffic flows from a private network to public network. This allows a limited number of public IP addresses to serve for the needs of even the largest corporation. Each device in the private network has its own private IP address. Traffic sent to a device on the public network will be dynamically assigned a specific port number at the public address by the NAT. The NAT maintains a "table" that links private address and port numbers to public port numbers and IP addresses.

With NAT on the boundary of the local area network, initiating an outbound connection is easy; on the other hand, receiving an incoming call is more difficult. The reason is that the internal extension numbers are non-routable from the public network. Users dialing in must be routed to an attendant to be connected to the correct extension. Clearly in the case of a NAT, there is no equivalent for an attendant, so unsolicited incoming calls cannot be supported.

The methods to solve the problems related to NAT are described in Newport network, "Solving the Firewall and NAT Traversal Issues for Multimedia Services over IP" and "Enabling Customers to Connect", incorporated herein for reference.

SUMMARY OF THE INVENTION

It is, therefore, an object of the present invention to provide a multimedia conference system and method that enables users in a local network to have direct communication with other users from the Internet.

It is another object of the present invention to provide a multimedia conference system and method for establishing direct communication between the user in private network and the terminal in the public network with existing local area network configurations, dispensing the need for manual implementation or changes of network setting.

It is yet another object of the present invention to provide a multimedia conference system and method that allows conference attendants from both private and public networks to have direct communication with personal mobility that frees them from limitations due to their locations in the network.

It is still another object of the present invention to provide a multimedia conference system and method that enables direct communication between User in the private network and Internet with both information security and freedom from the interferences of firewalls and NAT.

To achieve the above and other objects, the present invention includes a plurality of user agents (to receive call requests) constituting a local network; a calling terminal positioned outside the local network and connected to the local network via Internet; a network address translation (NAT) positioned on the gate of the local network as barrier between the calling terminal and the user agent, and a SIP Proxy Server positioned between the calling terminal and private network and logically installed in parallel with said NAT to receive session initiation protocol messages transmitted from the calling terminal, connect, and transmit IP addresses, so as to send the message to specific User Agent(s).

To achieve the above objects, another aspect of said SIP Proxy Server in the present invention includes more than two Network Interfaces: at least one to the Internet and at least one to the private network, so as to receive session initiation protocol message transmitted from the calling SIP terminal, connect and transmit IP address, and distribute said message to specific User Agent(s).

To achieve the above objects, yet another aspect of said SIP Proxy Server in the present invention logically includes a Registration Server, so that URI (Uniform Resource Identifier) of a plurality of User Agents in the private network can be registered to the Registration Server. Further, said Proxy Server can obtain the Contact List of User Agents with registered URI from the Registration Server, and transmit calls from the calling SIP terminal to individual User Agents by means of URI locating.

To achieve the above objects, still another aspect of the SIP Proxy Server includes: a Back to Back User Agent (B2BUA) that performs as the call mediation between the calling terminal and User Agents by tying two call legs of "calling SIP terminal to User Agents" and "User agents to calling SIP terminal". Further, the B2BUA establishes a RTP RELAY mechanism between the "calling SIP terminal" and "User agents" to enable real-time multimedia conference communication based on RTP (Real Time Transport Protocol).

The present invention can solve the issue that NAT or firewalls blocks direct peer-to-peer multimedia conference between private network and the Internet. Also, with existing private network configurations and consideration for information security, the present invention can establish a system and method for direct peer-to-peer multimedia conference communication, allowing attendants inside or outside the private network to conduct direct peer-to-peer or group-to-group multimedia communication, such as voice and video, beyond the limit of location and time.

Other features of the present invention will be described in the following section. Embodiments listed in the implementation section provide only examples to enhance understanding, rather than limitations on the present invention. Further, method, step, system, device, configuration, or other optional parts cannot limit the present invention, either. In addition, the present invention is defined by the patent claims.

THE EMBODIMENTS OF THE INVENTION

FIG. 1 is a drawing showing procedure for a SIP call process upon call mediation by a call agent (SIP Proxy Server) to process the calling and connection of a multimedia conference. As shown in FIG. 1, a calling SIP terminal 10 transmits a communication request message (INVITE) to a call agent (SIP Proxy Server) 20 as call mediation (step 41). The Proxy Server 20 that receives a communication request message then transmits the received communication request message (INVITE) to a called SIP terminal 30 (step 42).

Subsequently, the called SIP terminal 30 then transmits a message (100 Trying) for informing the processing of a call, to the Proxy Server 20 (step 43), and Proxy Server 20 which receives that message transmits the processing message for a call (100 Trying), to the calling SIP terminal 10 (step 44). Also, the called SIP terminal 30 transmits a calling signal (180 Ringing) to a Proxy Server 20 (step 45) and the Proxy Server 20 transmits a calling signal (180 Ringing) to the calling SIP terminal 10 (step 46) to inform the calling SIP terminal 10 of its receiving the call.

After that, the called SIP terminal 30 transmits a message (200 OK) for accepting the call establishment request, to a Proxy Server 20 (step 47) and the Proxy Server 20 transmits a message (200 OK) for accepting the call establishment request to the calling SIP terminal 10 (step 48). Subsequently, the calling SIP terminal 10 delivers an acknowledgement message ACK with respect to the response, to the Proxy Server 20 (step 49), and the Proxy Server 20 delivers an acknowledgement message ACK with respect to the response, to the called SIP terminal 30, so that a call is established (step 50). After that, the calling SIP terminal 10 and the called terminal 30 can perform a communication (step 51).

FIG. 2 is a drawing for the embodiment of the present invention of a multimedia conference system that enables communication between private network and the Internet. As shown in FIG. 2, the multimedia conference system 100 that enables direct communication of the present invention includes: a plurality of User Agents 101, 102, 103, 104, 105, to receive call requests, constituting the private network 110; a calling SIP terminal 150 located outside the private network 110 and connected with the private network 110 via Internet; a network address translation (NAT) 120 positioned between the calling SIP terminal 150 and the private network 110; a SIP Proxy Server 130 positioned between the calling SIP terminal 150 and the private network 110, logically deployed in parallel with the NAT block 120, to receive session initiation protocol message transmitted from the calling SIP terminal 150, connect and transmit IP addresses, and deliver the session initiation protocol message to specific User Agent(s), so as to establish a multimedia conference communication based on SIP. After that, the Back to Back User Agent (B2BUA) defined by SIP then ties the call legs of "private network to Internet" and "Internet to private network", and finally, applies an approach based on RTP (Real Time Transport Protocol) to compress and deliver data, so as to achieve real-time direct multimedia communication.

FIG. 3 is the diagram for the afore-mentioned embodiment of the present invention, plotting the SIP Proxy Server that processes the calling, connection, and communication of multimedia conference between the private network and the Internet. As shown in FIG. 3, private network 210 is comprised of two User Agents (internal computer): User Agent A 211 and User Agent B 212, and the public network 220 comprises User Agent D 221. The IP address of User Agent A 211 is 192.0.2.101 and the IP address of User Agent B 212 is 192.0.2.103; the IP address of User Agent D 221 is 17.0.0.1. Private IP address of the Proxy Server 230 is 192.0.2.102 and its Public IP address is 10.0.0.1.

Since User Agent A 211 and User Agent B 212 in the private network rely on Proxy Server 230 serves as the call mediation for external communication, both User Agent A 211 and User Agent B 212 are configured with the private IP address of the Proxy Server 230 [192.0.2.102] as their outbound proxy. And the object IP address for messages transmitted from the public network 220 is configured as the Public IP address of the Proxy Server 230 [10.0.0.1]. All conference attendants both in the private network 210 and the public network 220 should be registered to the Proxy Server 230 with duly SIP identities, i.e., Uniform Resource Identifier (URI) defined by SIP. Subsequently, messaged transmitted from the public network 220 can be sent to specific User Agent(s) by the URI (Uniform Resource Identifier) mechanism of the Proxy Server 230.

The Proxy Server 230 is responsible for: (1) establishing and connecting conference calls based on SIP; (2) applying B2BUA defined by SIP to perform as the call mediation between the private network 210 and the public network 220; (3) compressing and transmitting data by RTP(Real Time Transport Protocol) to provide peer-to-peer multimedia communication that is real-time and direct.

Before the establishing and connecting of conference between the private network 210 and the public network 220, conference attendants from the private network 210 and the public network 220 should be registered with SIP identity, i.e., Uniform Resource Identifier (URI) defined by the SIP to the Proxy Server 230. While processing the calling and connection of SIP conference, the Proxy Server 230 shall be listening on the default port 5060 on both interfaces to the private network 210 and the public network 220, whereas B2BUA, as the call mediation, shall be listening on default port 7060 on both the interfaces to the private network 210 and the public network 220. As soon as the call lands on the Proxy Server 230 either from the public network 220 or from the private network 210, the Proxy Server 230 checks for the following two conditions:

1. The Request URI is public (session request message transmitted from the private network 210 to the public network 220).

2. The Request URI is private network message and transmitted via public routes (session request message transmitted from the public network 220 to the private network 210).

If any one of the above condition is true, the Proxy Server 230 routes the call, so as to perform the call mediation function of B2BUA. B2BUA shall add its contact IP to the call, record its source path, and then send the call to its destination. Thus, the connection of the conference communication is accomplished. In addition, while executing the B2BUA function, the Proxy Server 230 modifies the SDP (Session Description Protocol) parameter's Origin field and Connection field to trigger the RTP-RELAY mechanism in the Proxy Server 230 to open its RTP ports to each sides of the communication, so as to enable real-time conference communication.

More particularly, as the SIP Proxy Server 230 establishes the connection for multimedia conference and connects the private network 210 and the public network 220, the SIP signals shall be routed to B2BUA. If the SIP signals come from an outgoing call by a User in the private network 210, B2BUA terminates the SIP signals and initiates new signals (by changing the SIP signal parameters and SDP parameters) to the public network 220, and vice-versa. B2BUA would also transmit an incoming call from the public network 220 to the User in the private network 210. Consequently, B2BUA shall tie the two call legs (dialogue), one from the private network and another from public network. After B2BUA ties the call legs, RTP Relay will do the media flow for real-time communication.

FIG. 4 is a drawing for another embodiment of the present invention, showing the procedure for a call processed by SIP Proxy Server in case that a call originates from the private network to the public network. For further explanation, in FIG. 4, two tasks of Proxy Server, "processing the calling and connection of a conference" and "mediating the call legs between private network and the public network" described in FIG. 3 are respectively referred as "SIP server" and "B2BUA".

In the first place, User 310 in the private network transmits a call (INVITE) to the called SIP terminal User 320 in the public network. The call (INVITE) is routed to the outbound SIP Proxy Server 330 of the private network (step 401). SIP proxy server 330 shall add its "Via" that records its path to the message and route the call to B2BUA 340(step 402). B2BUA executes the DNS (Domain Name Server) lookup on the URI Request to get the destination IP address of the call. Then B2BUA removes the previous Via header, modify the contact address and SDP parameters, and add its own Via header to the call. Subsequently, the call (INVITE) can be routed to the destination IP address with respect to the URI☐ Request. After passing through one or more Proxy Servers (not plotted in the drawing), the call (INVITE) shall reach the called User 320(step 403).

After that, the called User 320 responds with a message (100 Trying) to B2BUA 340(step 404). Then the called User 320 responds with a message (180 ringing) with its contact IP address. The response from the called User 320 shall reach B2BUA (step 405). B2BUA shall remove the via header of the response message(180 ringing), change the contact IP address of the called terminal User 320 to its own contact IP address, insert via header for the SIP proxy server 330 and the User 310, and send the response (180 ringing) to SIP server 330. From SIP server 330, the response (180 ringing) is routed to User 310 (step 406). The responses message (200 OK) for accepting the connection request from called terminal User 320 follows the same path (step 407,408).

After the connection between the User 310 and the called User 320 is established, the (ACK) message from User 310 for confirming the connection shall be sent directly to B2BUA 340 (step 409). From B2BUA 340, the same shall be sent to User 320 (step 410). As both the calling User 310 and called User 320 have learnt each other's contact IP address, both shall do the remaining transactions directly through B2BUA 340 and RTP Relay for real-time conference communication.

If User 310 intends to terminate the communication, a message to end the conference (BYE) shall be sent to B2BUA 340 (step 411). B2BUA 340 shall send the message for conference termination (BYE) to User 320(step 412). User 320 shall transmit a call (200 OK) for accepting connection termination to B2BUA 340 (step 413), and B2BUA 340 shall send the message to User 310(step 414) to terminate the communication.

FIG. 5 is a drawing for another embodiment of the present invention, showing the procedure for a call processed by SIP Proxy Server in case that a call originates from the public network to the private network. For further explanation, in FIG. 5, two tasks of Proxy Server, "processing the calling and connection of a conference" and "mediating the call legs between private network and the public network" described in FIG. 3 are respectively referred as "SIP server" and "B2BUA".

In the first place, the calling SIP terminal 510 from the public network transmits a call (INVITE) to User 520 in the private network. The call shall be routed to the SIP proxy server 530 of the private network (step 601). IP address of SIP server 530 is configured as the inbound entrance for the DNS (Domain Name Server). After receiving the call, SIP server 530 shall conduct location look-up on the call. Then it shall change the URI Request of the call to the IP address of the User Agent 520, add its Via header that records the path, and deliver the call to B2BUA 540 (step 602). B2BUA 540 then removes the Via header of previous message, modifies the contact address and SDP parameter, add its own Via header, and then route the call (INVITE) to the IP address of User 520 as per mapped in the URI Request of the call. Then, the call (INVITE) shall reach the User 520(step 603).

After that, User 520 sends a message (100 Trying) to B2BUA 540 (step 604), and then responds with another message (180 ringing) to B2BUA 540 (step 605). B2BUA 540 shall remove the Via header of the response message (180 ringing), insert Via header of the SIP proxy server 530 and Via header of the calling SIP terminal 510, and send the response (180 ringing) to SIP server 330. From SIP server 530, the response (180 ringing) is routed to the calling SIP terminal 510 (step 606). The response (200 OK) for accepting the connection request from User 520 follows the same path (step 607,608).

After the connection between the calling SIP terminal 510 and User agent 520 is established, the message (ACK) from the calling SIP terminal 510 for confirming the connection shall be sent directly to B2BUA 540 (step 609). From B2BUA 540, the same shall be sent to User 520(step 610). As both the calling SIP terminal 510 and called User agent 520 have learnt each other's contact IP address, both shall do the remaining transactions directly through B2BUA 540 and RTP Relay for real-time conference communication.

If calling SIP terminal 510 intends to terminate the connection of the conference, a message to end the conference (BYE) shall be sent to B2BUA 540(step 611). B2BUA 540 shall send the message for conference termination (BYE) to User 520 (step 612). User 520 shall transmit a call (200 OK) for accepting connection termination to B2BUA 540 (step 613), and B2BUA 540 shall send the message to the calling SIP terminal 510 (step 614) to terminate the communication.

The above-mentioned embodiments provide only examples to enhance understanding, rather than limitations on the present invention. Further, method, step, system, device, configuration, or other optional parts cannot limit the present invention, either. In addition, the present invention is defined by the patent claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 1:
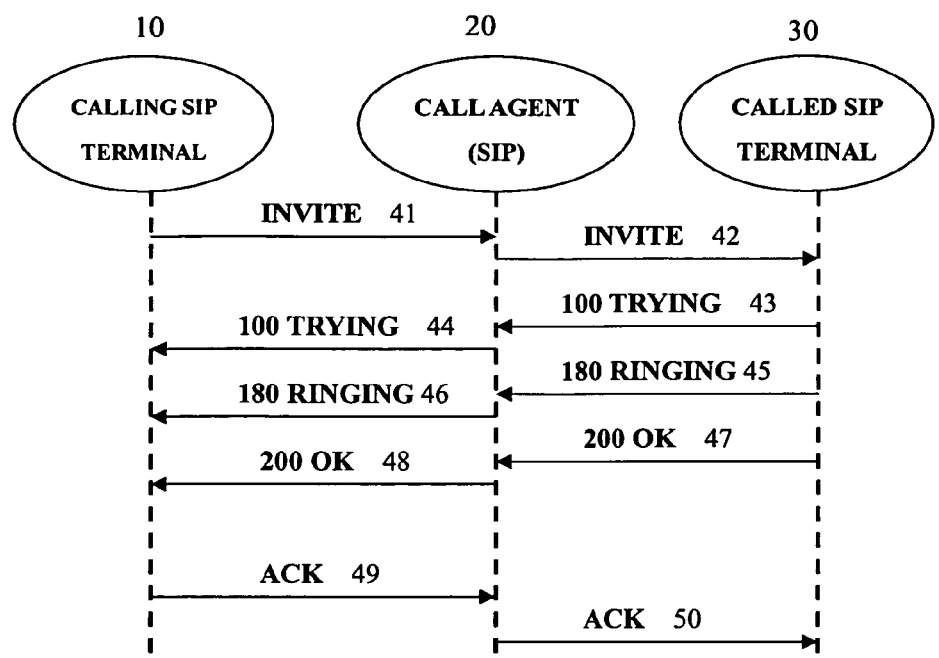
FIG. 1 is a drawing showing procedure for a call process upon call mediation by a call agent (SIP Proxy Server) to process the calling and connection of a multimedia conference.
Figure 2:
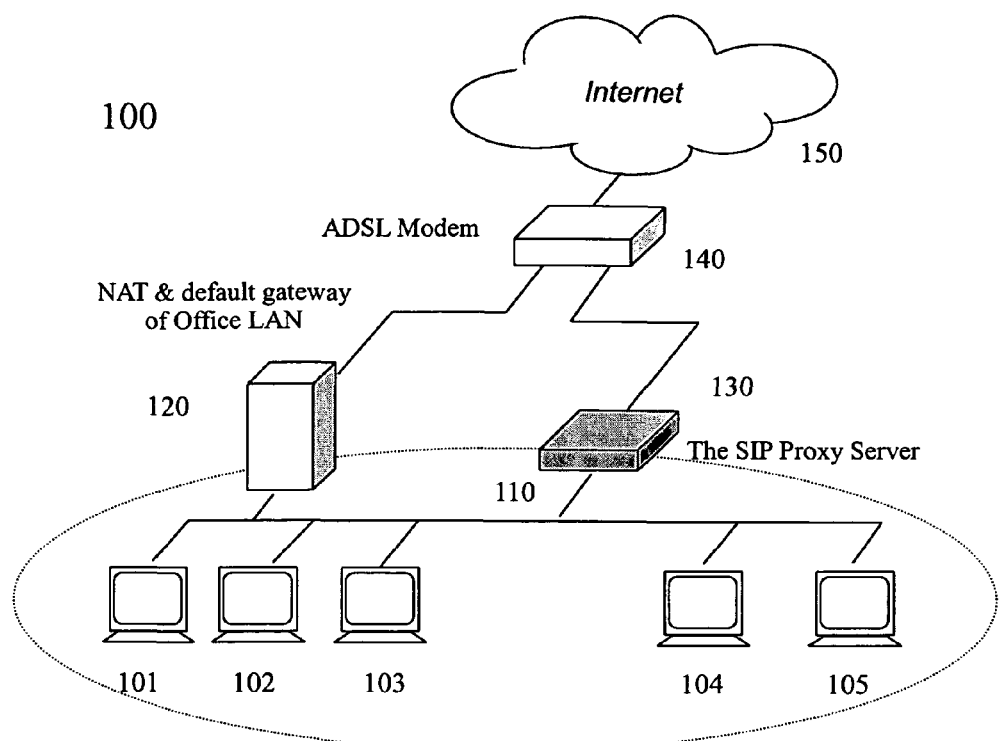
FIG. 2 is a drawing for an embodiment of the present invention, plotting a NAT and a SIP Proxy Server deployed in parallel with the NAT.
Figure 3:
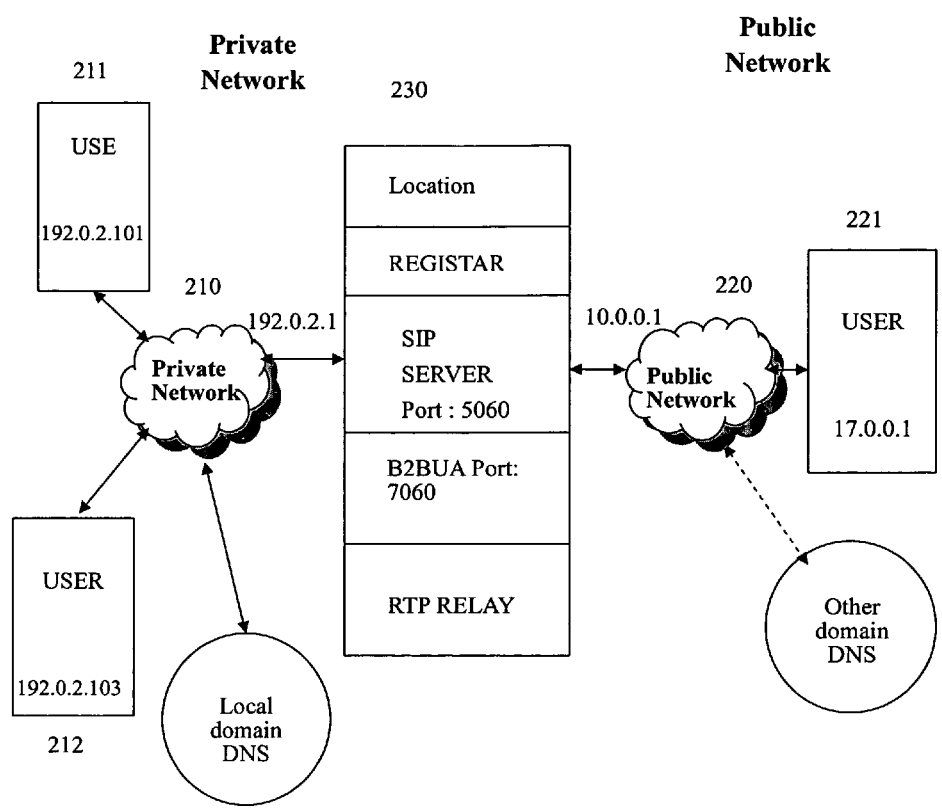
FIG. 3 is the diagram for the afore-mentioned embodiment of the present invention, plotting the SIP Proxy Server that processes the calling, connection, and communication of multimedia conference between the private network and the public network.
Figure 4:
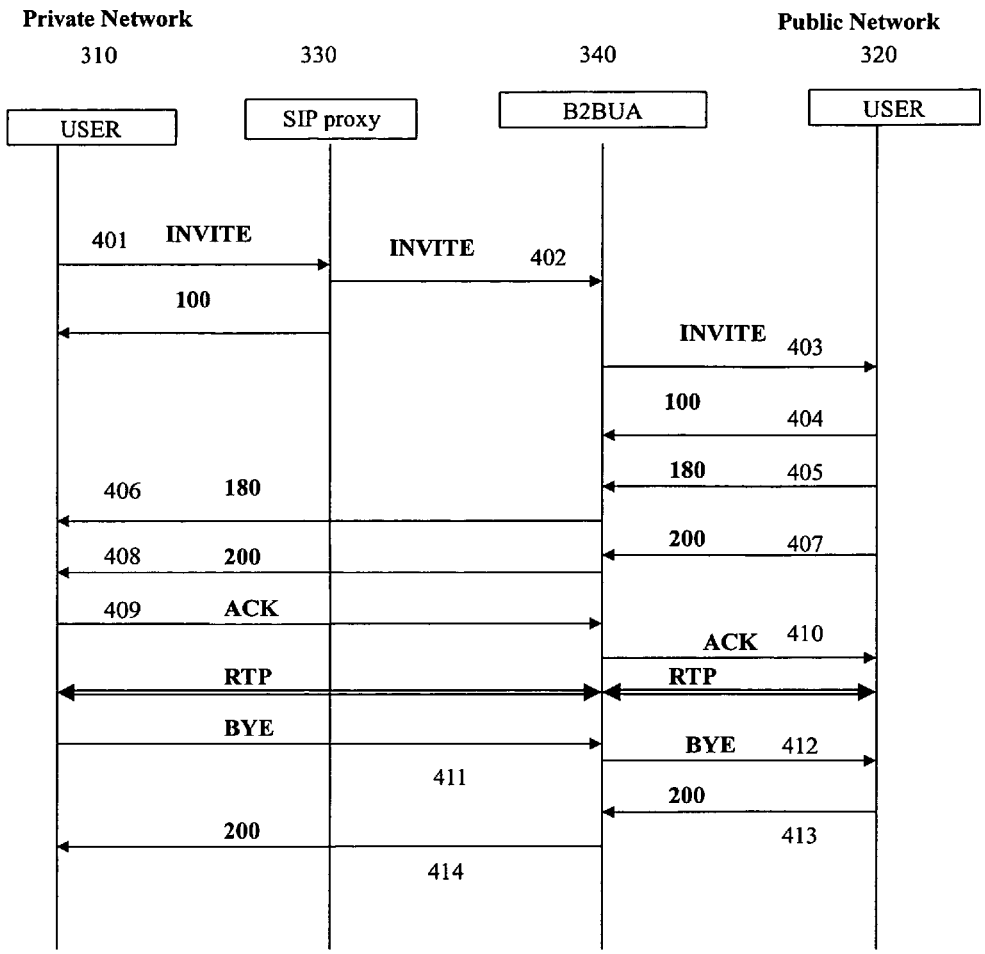
FIG. 4 is a drawing for another embodiment of the present invention, showing the procedure for a call processed by SIP Proxy Server in case that a call originates from the private network to the public network.
Figure 5:
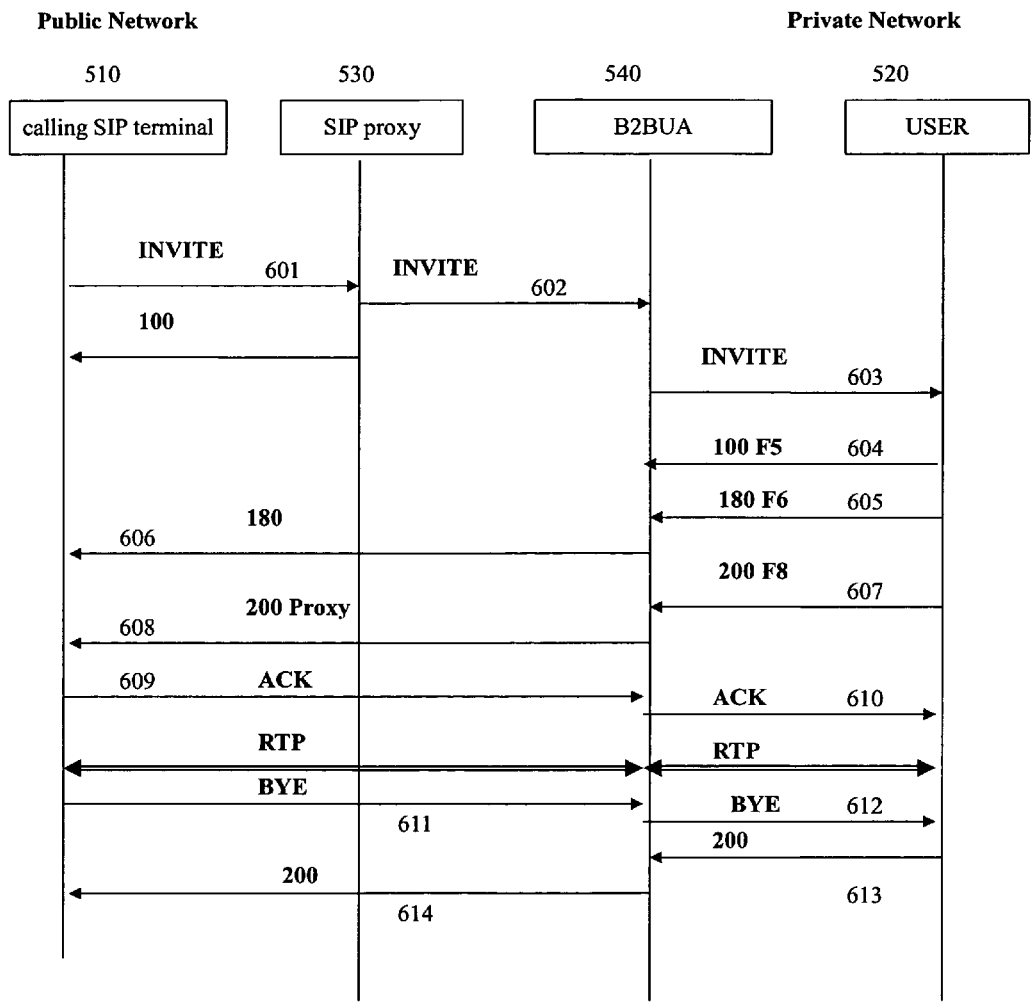
FIG. 5 is a drawing for another embodiment of the present invention, showing the procedure for a call processed by SIP Proxy Server in case that a call originates from the public network to the private network.

What is claimed is:

1. A multimedia conference system that enables direct communication between private network and the Internet, including:
   a plurality of user agents (to receive call requests) positioned in the private network;
   a calling SIP terminal positioned in a public network;
   a network address translation (NAT) positioned on the gate of the local network as barrier between the calling terminal and the user agent;
   a SIP Proxy Server positioned between the calling terminal and private network and logically installed in parallel with said NAT to receive session initiation protocol messages transmitted from the calling terminal, connect, and transmit IP addresses without going through said NAT and without using a path-coupled signaling protocol to establish a direct connection with the user agents, so as to send the message to specific User Agent(s), said SIP Proxy Sewer has a Network Interface directly connected to a public network and a Network Interface directly connected to the private network.

2. The multimedia conference system according to claim 1, wherein said SIP Proxy Server selects specific User Agent in response to the call (INVITE) from the calling terminal, performing as the interface to connect both sides of the conference communication.

3. The multimedia conference system according to claim 1, wherein said Proxy Server implements call connection in accordance with SIP protocol.

4. The multimedia conference system according to claim 1, wherein said Network Interface directly connected to the public network is configured with independent Public IP, and said Network Interface directly connected to the private network is configured with the IP address defined by private network.

5. The multimedia conference system according to claim 4, wherein said Proxy Server connects calls from the calling SIP terminal to individual User Agents.

6. The multimedia conference system according to claim 5, wherein said Proxy Server logically includes a Registration Server so that said a plurality of User Agents can register URI (Uniform Resource Identifier) to the Registration Server.

7. The multimedia conference system according to claim 6, wherein said Proxy Server can obtain a Contact List of User Agents with registered URI from the Registration Server, and transmit calls from the calling SIP terminal to individual User Agents by means of URI locating.

8. The multimedia conference system according to claim 7, wherein said Proxy Server includes a "Back to Back User Agent B2BUA" to perform as the call mediation between the calling SIP terminal and User Agents.

9. The multimedia conference system according to claim 8, wherein the Back to Back User Agent of said Proxy Server ties two call legs of "calling terminal to User Agents" and "User Agents to calling SIP terminal".

10. The multimedia conference system according to claim 9, wherein the Back to Back User Agent of said Proxy Server also establishes a PACKET RELAY mechanism between the "calling SIP terminal" and "User Agents".

11. A multimedia conference system that enables direct communication between private network and Internet, including:
   a plurality of user agents to constitute a local network;
   a proxy server connected to the user agents via the local network, performing as the interface to public network to receive session initiation protocol messages transmitted from the user agents, connect, and transmit IP addresses without going through said NAT and without using a path-coupled signaling protocol to establish a direct connection with the user agents, said proxy server has a Network Interface directly connected to a public network and a Network Interface directly connected to the private public network;
   a network translation (NAT) positioned between e called terminal and the local network and logically deployed in parallel with the proxy server.

12. The multimedia conference system according to claim 11, wherein the Proxy Server executes the DNS lookup on the call (INVITE) transmitted from the User Agent to connect the called SIP terminal as the interface between both sides of the conference communication.

13. The multimedia conference system according to claim 11, wherein the Proxy Server implements call connection in accordance with SIP protocol.

14. The multimedia conference system according to claim 11, wherein said Network Interface directly connected to the public network is configured with independent Public IP, and said Network Interface directly connected to the private network is configured with the IP address defined by private network.

15. The multimedia conference system according to claim 14, wherein said Proxy Server connects calls from the User Agent to the called SIP terminal.

16. The multimedia conference system according to claim 15, wherein said Proxy Server logically includes a Registration Server so that said a plurality of User Agents can register URI (Uniform Resource Identifier) to the Registration Server.

17. The multimedia conference system according to claim 16, wherein said Proxy Server includes a "Back to Back User Agent (B2BUA)" to perform as the call mediation between the User Agent and the called terminal.

18. The multimedia conference system according to claim 17, wherein said Back to Back User Agent of the Proxy Server ties two call legs of "User Agent to the called SIP terminal" and "the called SIP terminal to User Agent".

19. The multimedia conference system according to claim 18, wherein said Back to Back User Agent of the Proxy Server also establishes a PACKET RELAY mechanism between the "User Agent" and the "called SIP terminal".

20. A method for multimedia conference that enables direct communication between private network and public network, including:
  (1) Deploying a Proxy Server logically in parallel with NAT, to receive incoming call request from the calling SIP terminal which connects to the Proxy Server via Internet, validate the request, and record the routing information for the call without going through said NAT and without using a path-coupled signaling protocol to establish a direct connection with specified User Agent, said Proxy Server has a Network Interface directly connected to a public network and a Network Interface directly connected to the private public network;
  (2) Forwarding the call request to specified User Agent and establishing the call connection;
  (3) Conducting multimedia conference communication between the calling SIP terminal and specified User Agent in the private network.

21. The method for multimedia conference system according to claim 20, wherein said (step 2) further includes:
  (2-1) User Agent in the private network registers its URI (Uniform Resource Identifier) associated with contact information to the Registration Server logically included in the Proxy Server.

22. The method for multimedia conference system according to claim 20, wherein said (step 2) further includes:
  (2-2) Proxy Server obtains the Contact List of User Agents from said Registration Server and, by means of URI query, and forwards the calls originated from the calling SIP terminal to individual User Agent(s).

23. The method for multimedia conference system according to claim 22, wherein said step (3) further includes:
  (3-1) "Back to back User Agent (B2BUA)" is used as the call mediation to process multimedia conference communication between the calling SIP terminal in the public network and the assigned User Agents in the private network.

24. The method for multimedia conference system according to claim 23, wherein, said Back to Back User Agent (B2BUA) in (step 3-1) further sets up the two call legs (one connected to the calling SIP terminal and the other connected to the designated User Agent) as the call proceeds.

25. The method for multimedia conference system according i to claim 24, wherein said (step 3-1) further includes:
  (3-2) Back to back User Agent (B2BUA) establishes the PACKET RELAY mechanism between the User Agents and calling SIP terminal while the call proceeds.

26. A method for multimedia conference that enables direct communication between private network and public network, including:
  (1) Deploying a Proxy Server deployed logically in parallel with a NAT to receive incoming call request originating from the User Agent located inside private network, validate the request, and record the routing information for the call without going through said NAT and without using a path-coupled signaling protocol to establish a direct connection with the User Agent, the Proxy Server has a Network Interface directly connected to a public network and a Network Interface directly connected to the private public network;
  (2) Performing DNS lookup at the Proxy Server based on the request originating from User Agent and forward the call request to called SIP terminal which is located outside the private network to establish the call connection; and
  (3) Conducting multimedia conference communication between the calling User Agent and the called SIP terminal.

27. The method for multimedia conference system according to claim 26, wherein, said (step 1) further includes:
  (1-1) User Agents in the private network register their URI (Uniform Resource Identifier) information associated with contact information to the Registration Server logically included in the Proxy Server.

28. The method for multimedia conference system according to claim 27, wherein, said (step 3) further includes:
  (3-1) "Back to back User Agent (B2BUA)" processes multimedia conference communication between the calling SIP terminal in the public network and the assigned User Agents in the private network.

29. The method for multimedia conference system according to claim 28, wherein, said (step 3-1) Back to back User Agent (B2BUA) sets up the two call legs (one connected to the calling User Agent and the other connected to the called terminal) while the call proceeds.

30. The method for multimedia conference system according to claim 29, wherein, said (step 3-1) further includes:
  (3-2) Back to back User Agent (B2BUA) established PACKET RELAY mechanism between "User Agents" and "the called terminal" while the call proceeds.

* * * * *